US006609803B2

(12) United States Patent
Lichfield

(10) Patent No.: US 6,609,803 B2
(45) Date of Patent: Aug. 26, 2003

(54) LIGHTING EXTENSION FOR PHOTOGRAPHIC EQUIPMENT

(76) Inventor: Cynthia Lichfield, 955 Delphi Dr., Lafayette, CO (US) 80026

( * ) Notice: Subject to any disclaimer, the term of this patent is extended or adjusted under 35 U.S.C. 154(b) by 0 days.

(21) Appl. No.: 09/938,199

(22) Filed: Aug. 23, 2001

(65) Prior Publication Data

US 2003/0039110 A1 Feb. 27, 2003

(51) Int. Cl.[7] .......................... G03B 15/02; G03B 15/06
(52) U.S. Cl. .............................................. 362/16; 362/3
(58) Field of Search ............................... 362/3, 4, 5, 8, 362/10, 16, 17, 18, 33, 370, 432, 154, 156, 294; 396/3, 4, 5

(56) References Cited

U.S. PATENT DOCUMENTS 4,144,556 A * 3/1979 Bond .......................... 362/16
4,292,662 A   9/1981 Gasperini
5,077,640 A * 12/1991 Butler, Jr. ................... 362/18
6,106,124 A   8/2000 Tarsia
6,343,184 B1 * 1/2002 Huebner ...................... 396/4

FOREIGN PATENT DOCUMENTS

FR    2626386 A1    7/1989
FR    2699696 A1    6/1994

* cited by examiner

Primary Examiner—Y. My Quach-Lee
(74) Attorney, Agent, or Firm—Patton Boggs LLP

(57) ABSTRACT

A method and apparatus for diffusing light to photograph an object. A cover is placed over an object and surrounds the object. The cover is made of translucent material that diffuses light from outside of the cover and minimizes shadows cast by the object. A lens of a camera fits through an opening proximate a top of the cover to photograph the object.

51 Claims, 9 Drawing Sheets

LIGHTING EXTENSION FOR PHOTOGRAPHIC EQUIPMENT

FIELD OF THE INVENTION

This invention relates to photography. More particularly, this invention relates to a method and apparatus for providing lighting for taking photographs. Still more particularly, this invention relates to a method and apparatus for providing lighting for photographs of small objects.

PROBLEM

Small objects such as pieces of jewelry and baseball cards are often photographed for such purposes as selling, cataloging and displaying the objects. With the advent of internet technologies and web sites, such as E-bay, there is an increasing need for digital images of small objects to sell the objects over the internet.

Any photograph of an object that is to be used for a presentation, cataloging or display cannot have glare, shadows, reflections or dullness of color. In these photographs, it is important to have lighting that minimizes shadows in order to properly display the object. Lighting that minimizes shadow and glares are a particular problem for shiny objects such as jewelry, coins and printed circuit boards. These shiny objects typically have hot spots glare and reflections that are unacceptable in display photographs. The pixels in a digital photograph need a softer subtler light source to allow for even dispersion of light. Therefore, equipment is needed that evenly diffuses light cast upon the object. Furthermore, the camera taking the photograph cannot move in order for the picture to be crisp.

In the past, the only way to get the proper lighting for such pictures included professional lighting in a studio, a framed lighting tent with an external light source and a dome with internal lighting. Heretofore, this equipment produced has been prohibitively expensive. Furthermore, some objects cannot be moved to go to a studio. For example, some archeological objects cannot be moved when being documented. Cameras available today allow an amateur to take professional quality photographs at an affordable cost. Therefore, users of such cameras want a lighting system that is inexpensive and mobile to solve the above and other problems.

SOLUTION

The above and other problems are solved and an advancement in the art is made by the lighting extension of the present invention. A first advantage of this invention is that no internal lighting system is needed. The lighting extension of the present invention uses external lighting such as lighting in a room or natural sunlight. The lighting extension of this invention evenly disperses light from the external lighting to eliminate glare, shadows and reflections from a photograph. Thus, the expense of a lighting system is avoided.

A second advantage of this invention is that this lighting is easily transportable. The lighting extension of this invention eliminates the need for extra photography gear, such as tripod, cables, electricity, expensive lighting and light diffusing devices. Thus, the system does not require extra equipment that is unwieldy and requires outside sources of power. Furthermore, this lighting extension has very few pieces and thus set up time is minimal. This allows the light extension to be lightweight therefore and easy to carry. A carrying case may also be provided that allows for easy transportation of the lighting system.

A third advantage of this invention is that even a relative novice may take professional quality photographs of small objects. The lighting extension system has a mounting bracket that holds a camera in place to prevent movement which may degrade the quality of a photograph. Thus, the lighting extension of this invention acts as a tripod stabilizing the camera. Furthermore, a camera lens protrudes through an opening in the lighting extension. This places a camera in the proper position to take a quality picture.

A fourth advantage of this invention is that accessories may be added to the lighting extension to change the photographs. One accessory is a tripod or extension collar that allow the lighting extension to be used to take pictures of larger objects or change the angle of the pictures. Accessories may also be used to change lighting colors, background and provide other special effects specific to photography.

In accordance with this invention, a lighting extension is an apparatus that diffuses light to photograph an object having the following components. A cover that surrounds an object and is made of translucent material that diffuses light from outside of the cover to minimize shadows cast by the object. An opening proximate a top side of the cover allows a lens of a camera through the cover to photograph the object.

In a first preferred embodiment, the cover is shaped as a hemisphere. In alternative embodiments the cover may be shaped as a cone, a cube, bell shaped or any other three dimensional polygonal shape.

The lighting extension may also include a camera mounting bracket that affixes to the cover proximate the opening and holds a camera in a position to allow the camera to take a photograph though the opening. The camera mounting bracket includes a base that supports the camera. The base is made of a platform that includes a coupling that affixes to the cover proximate the opening. The base also has an opening through the platform that mates with the opening through the cover to allow the lens of the camera to photograph the object through the cover.

In a preferred embodiment, a locking mechanism affixes the camera to the platform. The locking mechanism may include a brace that extends upward substantially perpendicular from one side of the platform, an opening through the brace, and a screw that fits through the opening and mates with a treaded opening on the camera to affix the camera to the base.

In a preferred embodiment, the base mates with a particular type of camera. Each base may then have indicia that identifies the particular type of camera with which the base mates.

The lighting extension may also include a lip around a perimeter of a bottom side of a cover to facilitate resting the cover on a surface over the object.

In order to facilitate different sizes of objects, the lighting extension may include an extension collar made of translucent material that forms a wall having a shape of the bottom perimeter of the cover and upon which a bottom perimeter of the cover rests to increase the inside height of the cover. Preferably, the extension collar is seamless. Thus the extension collar may be a flat piece of translucent material having a first end and a second end. The first end bends to affix to the second end to create the shape of the bottom perimeter. The lip around the bottom perimeter of the cover rest upon an upper side of the extension collar. The cover may be rotable about said extension to change camera angles.

Alternatively, Legs may be affixed to the bottom of the cover to fit over even larger objects or to give a photograph greater depth. The legs may have one or more legs that are shorter in length than the remaining legs to allow the lighting extension to be angled to provide a different camera angle.

In a preferred embodiment, a pad made of a colored material rests upon a surface and the cover rests upon the pad. The pad provides a background for said photograph.

In a preferred embodiment, a foil may be wrapped around the cover to change the ambient light. The foil may be made of silver or gold photographic material. Alternatively, the foil may have one side made of gold material and one side of silver material. The foil may then be turned inside out to use the desired material. The foil may be made of a flat piece of photographic fabric having a first end and second end, the first ends wraps around and affixes to the second end to enclose the cover.

In a preferred embodiment the lighting extension may include a carrying case that receives the cover and stores the cover for use.

BRIEF DESCRIPTION OF THE DRAWINGS

The above and other features of this invention may be understood from the detailed description below and the following drawings.

DETAILED DESCRIPTION

This invention relates to a method and apparatus for providing lighting for photograph of objects. This invention is an accessory for a camera that minimizes shadows cast by an object to generate a better quality of photograph of the object. This invention is described with references to the above described drawings. Where appropriate the same references numbers have been used in drawings to describe the same elements.

Figure 1:
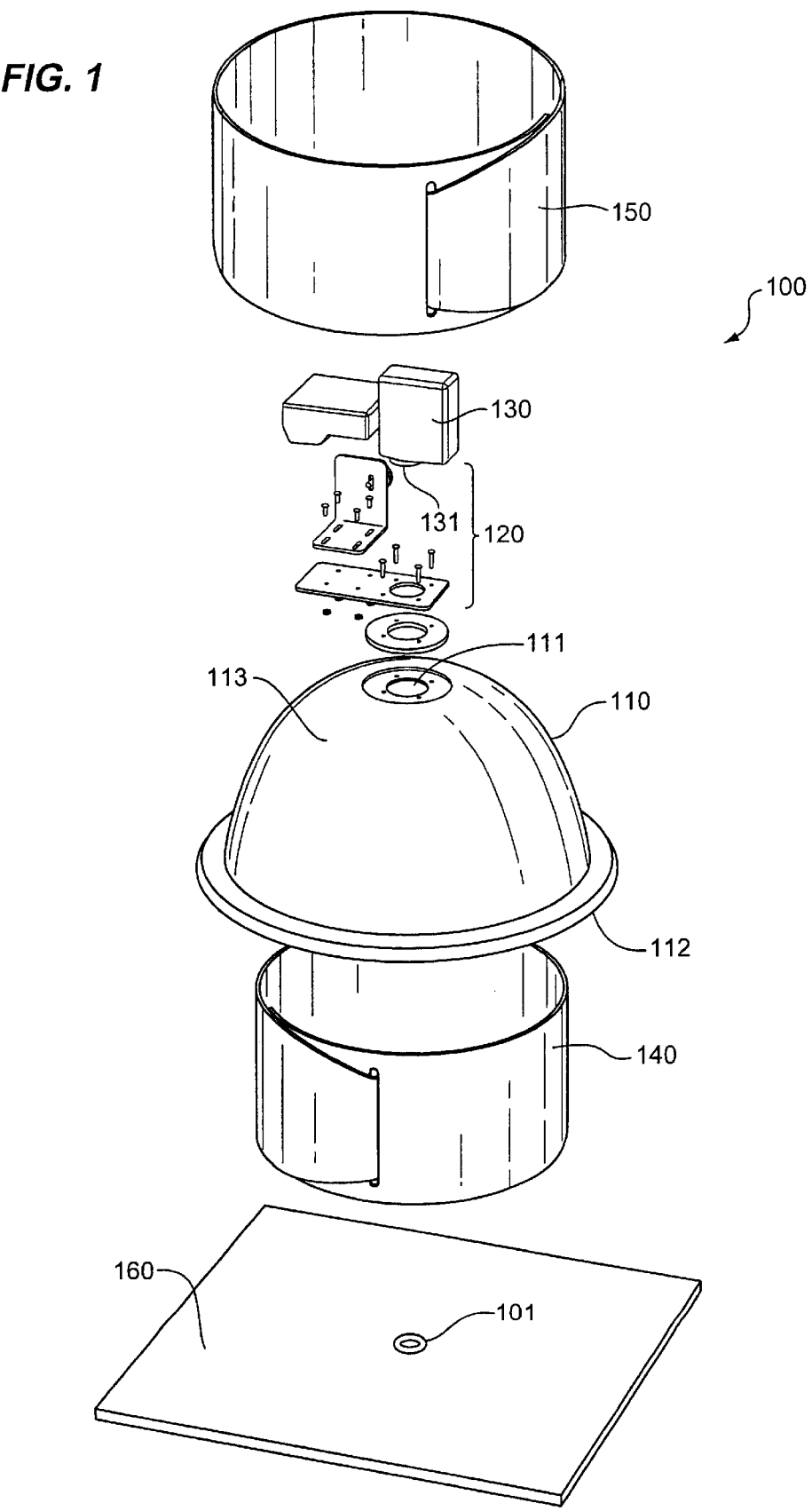
FIG. 1 illustrating an exploded view of a preferred exemplary embodiment of this invention.

FIG. 1 illustrates an exploded view of a preferred embodiment of this invention. Lighting extension 100 for use with camera 130 in photographing objects such as ring 101. Lighting extension 100 includes a cover 110, a camera mounting bracket 120, extension collar 140, foil 150, and pad 160.

Figure 5:
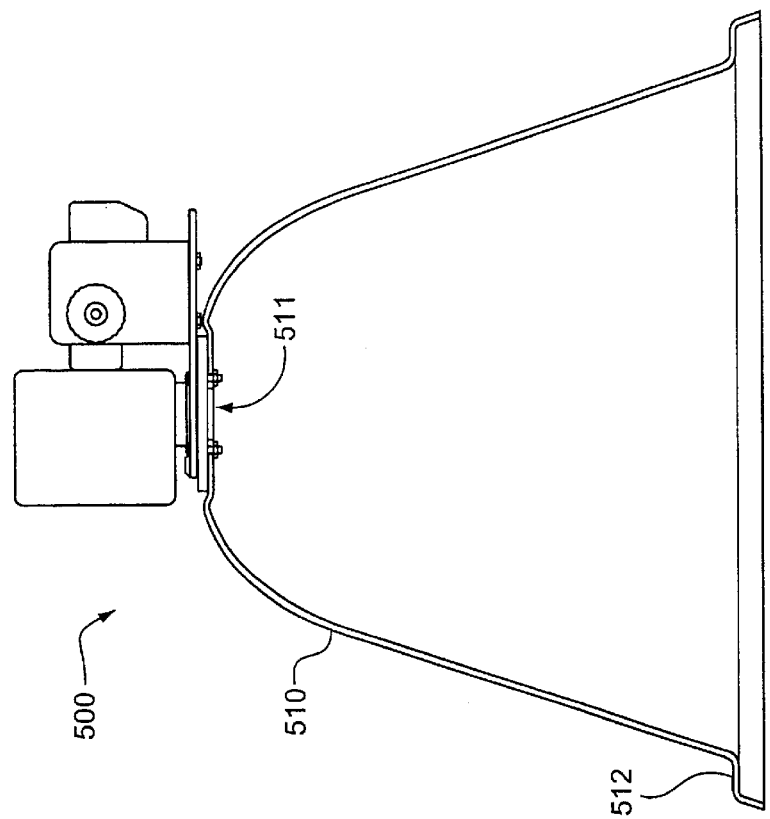
FIG. 5 illustrating a cross sectional view of a cover in an alternative embodiment having a conical shape.
Figure 4:
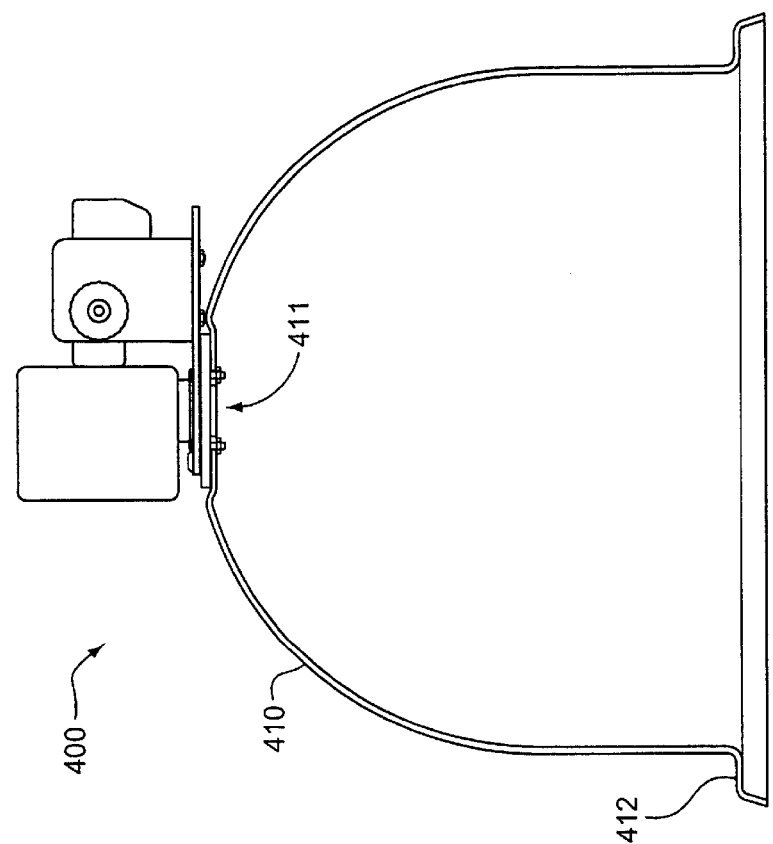
FIG. 4 illustrating a cross sectional view of a cover in an alternative embodiment having a bell shape.

In a simplest form, lighting extension 100 includes a cover 110 that is placed over an object. Cover 110 is made of translucent material that diffuses light being cast upon the object to minimize shadows. In the preferred embodiment, cover 110 is made of a milky white plexiglass to diffuse the light. However, other translucent material may be used. Preferably, cover 110 has a seamless surface to minimize any shadows or changes in light being cast upon the object. In a preferred embodiment, cover 110 has a hemispherical shape. However, FIG. 4 illustrates a cross sectional view of cover 410 having opening 411 and lip 412. Cover 410 has a bell shape. FIG. 5 illustrates a cross sectional view of an alternative cover 510 having an opening 511 and lip 512. Cover 510 has a conical shape. One skilled in the art will recognize that alternative shapes such as a cube may also be used for cover 110.

Figure 3:
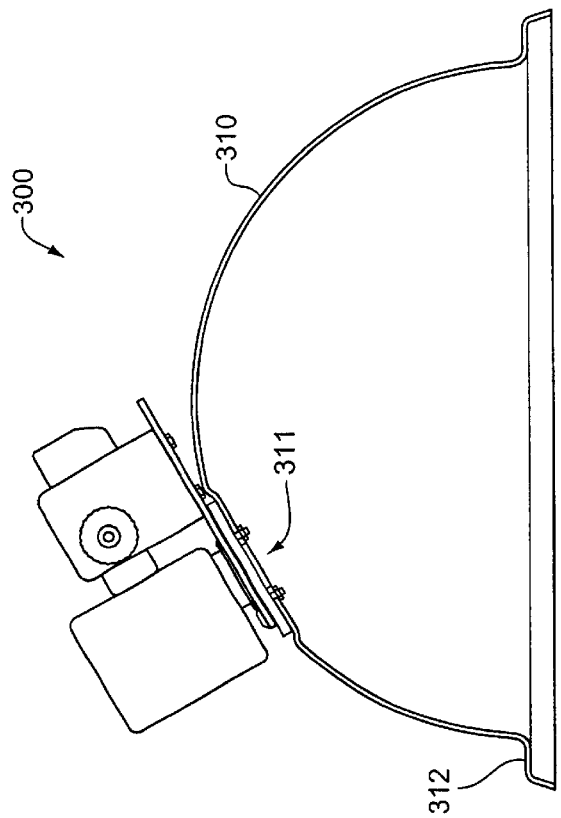
FIG. 3 illustrating a cross sectional view of a cover of an alternative embodiment having alternate placing of the opening.
Figure 2:
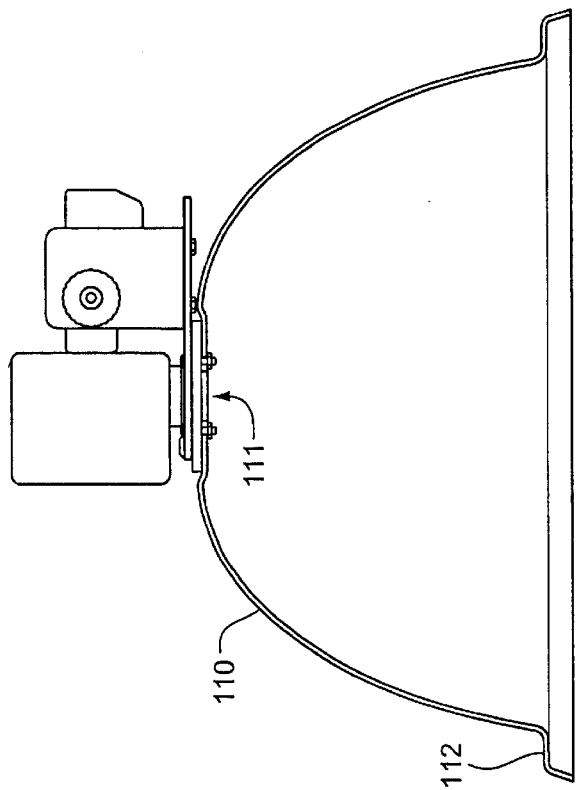
FIG. 2 illustrating a cross sectional view of a cover of the preferred exemplary embodiment.
Figure 6:
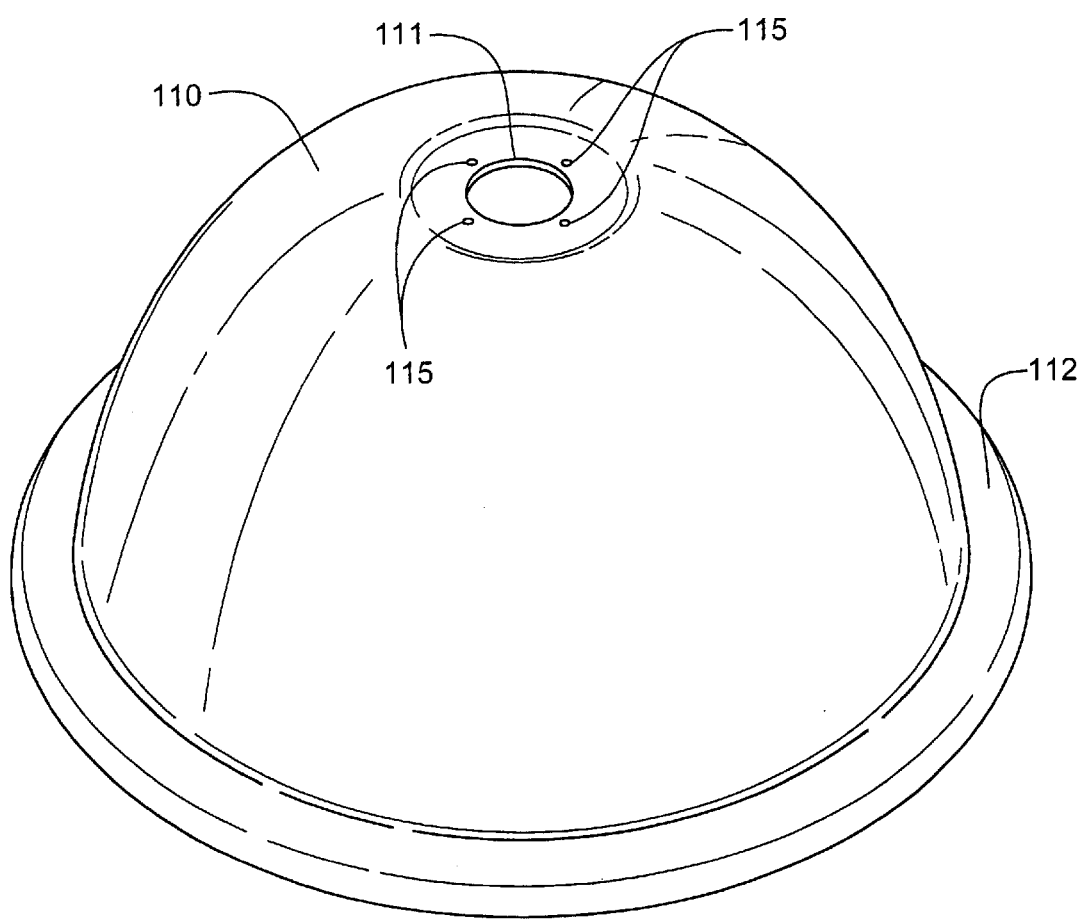
FIG. 6 illustrating a top side view of a cover in the preferred exemplary embodiment.

FIG. 6 illustrates a top side view of a preferred embodiment of cover 110. Cover 110 includes an opening 111 that allows a lens of a camera into cover 110 to photograph the object. Preferably, opening 111 on a top side of cover 110 directly over the object to be photographed. This is shown in FIG. 2 illustrating a cross section of a preferred embodiment of cover 110, In FIG. 2, opening 111 is at the apex of the hemispherical shape on a top side of cover 110. FIG. 3 illustrates an alternative embodiment of cover 110. Cover 310 includes an opening 311 which is off center from the apex of the hemispherical shape. The placement of opening 311 allows photographs from a different angle to be taken.

Referring back to FIG. 6, Lip 112 extends outwards from a lower perimeter or circumference of cover 110. Lip 112 facilitates resting cover 110 on a surface over an object. Lip 112 may also be used to rest cover 110 upon extension collar 140 (See FIG. 1).

In a preferred embodiment, cover 110 may also include holes 115 proximate opening 111. Holes 115 mates with screws from camera mounting bracket 120 to secure camera mounting bracket 120 to cover 110. One skilled in the art will recognize that other methods may be used to affix mounting bracket 120 to cover 110.

Referring to FIG. 1, lighting extension 100 includes camera mounting bracket 120 in a preferred embodiment. Camera mounting bracket 120 affixes to cover 110 proximate opening 111 and holds camera 130 in a position to allow camera 130 to take a photograph though opening 111.

Figure 7:
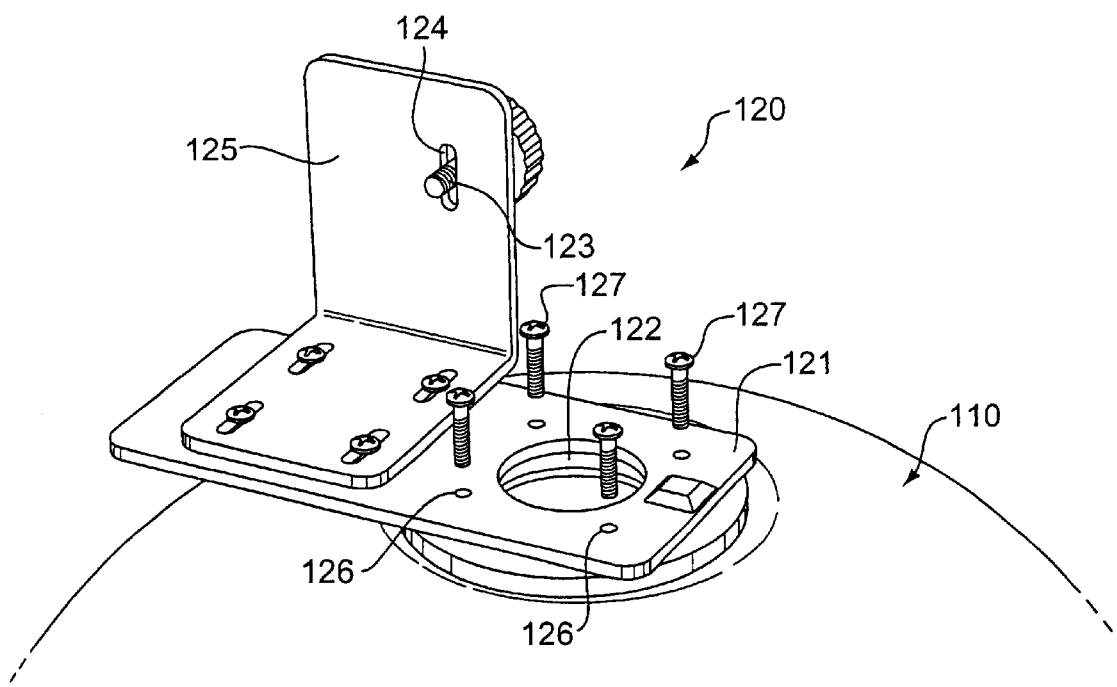
FIG. 7 illustrating a front side view of a camera mounting bracket in the preferred exemplary embodiment.

FIG. 7 illustrates a preferred embodiment of camera mounting bracket 120. Camera mounting bracket 120 includes base 121 that supports camera 130. Base 121 comprises a platform that includes a coupling that affixes to said cover proximate opening 111. In a preferred embodiment, the coupling is a plurality of holes 126 that mate with holes 115 (FIG. 6) in cover 110. Screws 127 fit through holes 126 and holes 115 to secure camera mounting bracket 120 to cover 110.

Base 121 has an opening 122 through the platform that mates with opening 111 through cover 110. Opening 122 allows a lens of camera 130 to photograph the object through the cover.

A locking mechanism affixes camera 130 to camera mounting bracket 120. Referring to FIG. 7, the locking mechanism is provided by brace 125 that extends upward from and substantially perpendicular to one side of base 121. Opening 124 is a longitudinal slot through brace 125. Screw 123 fits through opening 124 and mates with a treaded opening on camera 130 to affix camera 130 to camera mounting bracket 120.

In a preferred embodiment mounting bracket 120 is design to affix a Nikon Coolpix 990 digital camera. One skilled in the art will recognize that mounting bracket 120 may be designed to mate with other types of cameras. If more than one type of camera are supported by different camera mounting brackets 120, mounting bracket 120 may include indicia on camera mounting bracket 120 that identifies the particular type of camera that mates with camera mounting bracket 120. In a preferred embodiment, the indicia is different colors on mounting brackets 120. One skilled in the art will recognize many other types of indicia may be used including, but not limited to alphanumeric symbols.

Sometimes, an object, such as ring 101, requires a cover 110 that is bigger to completely enclose the object. Extension collar 140, shown in FIG. 1, may be used in these circumstances. Extension collar 140 is made of translucent material and forms a wall having a shape of the bottom perimeter of cover 110. The bottom perimeter of cover 110 rests on top of extension collar 140 to increase the inside height of cover 110. Preferably, extension collar 140 is made of seamless material.

Figure 12:
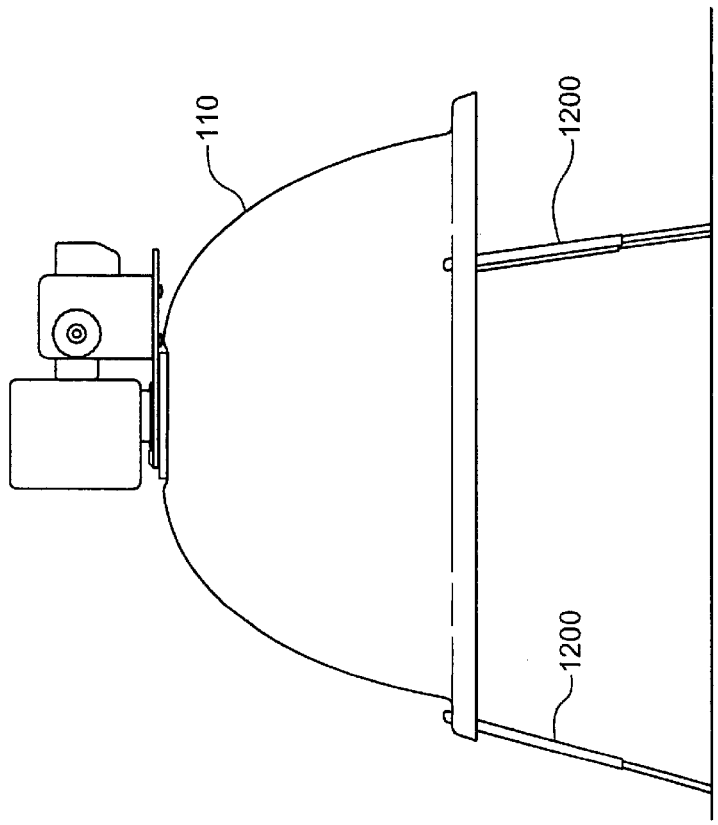
FIG. 12 illustrating a lighting extension of this invention with legs affixed to the cover.

Alternatively, legs may be affixed to the bottom of cover 110 to increase the inside height of the cover. FIG. 12 illustrates a side view of lighting extension system 100 with legs 1200 affixed to the bottom side of cover 110. In a preferred embodiment, legs 1200 have threads (Not Shown) that are mated to threads in openings (Not Shown) on a bottom lip of the cover 110. One skilled in the art will recognize that any number of other methods may be used to affix legs 1200 to cover 110.

Figure 13:
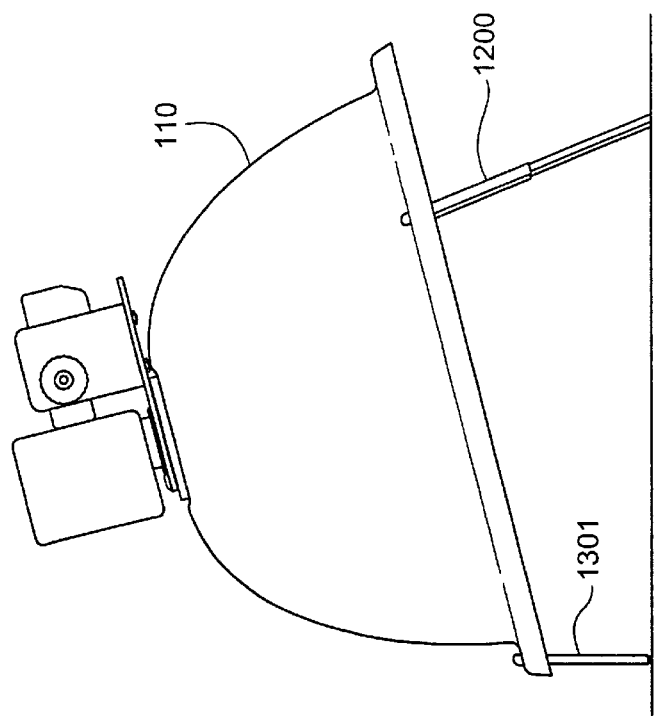
FIG. 13 illustration a lighting extension with legs of uneven height affixed to the cover.

FIG. 13 illustrates an alternative embodiment in which at least one leg 1301 is shorter in length than other legs. This allows the cover to be angled to take photographs from a different, slanted angle. One skilled in the art will recognize the exact length of the legs may be varied to change height and camera angles.

Figure 8:
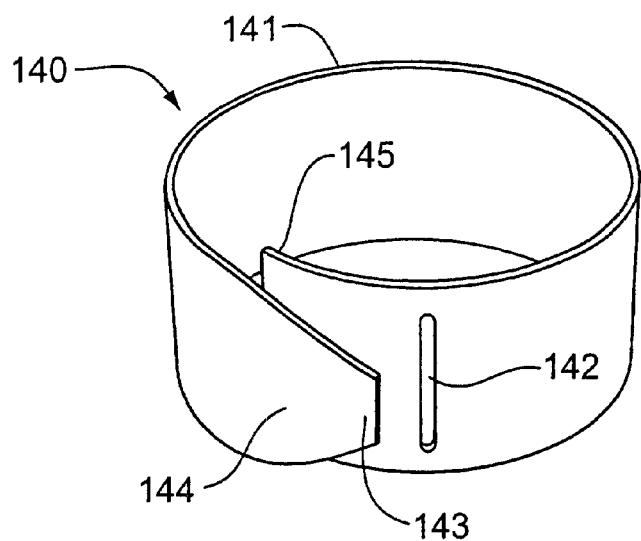
FIG. 8 illustrating a top side view of an extension collar in a preferred exemplary embodiment.

FIG. 8 illustrates a preferred embodiment of extension collar 140. Extension collar 140 is a flat piece 141 of said translucent material having a first end 144 and a second end 145. First end 144 wraps around and affixes to second end 145 to create the shape of the bottom perimeter of cover 110. In a preferred embodiment, first end 144 affixes to second end 145 in the following manner. First end 144 has a tapered end 143 that fits into slot 142 on second end 145.

In an alternative embodiment, extension collar 140 has a smaller diameter than the bottom perimeter of cover 110. Thus, cover 110 rests upon extension collar 140 in an overlapping manner. This allows cover 110 to be rotatable on top of extension collar 140 to allow pictures to be taken at different angles.

Figure 9:
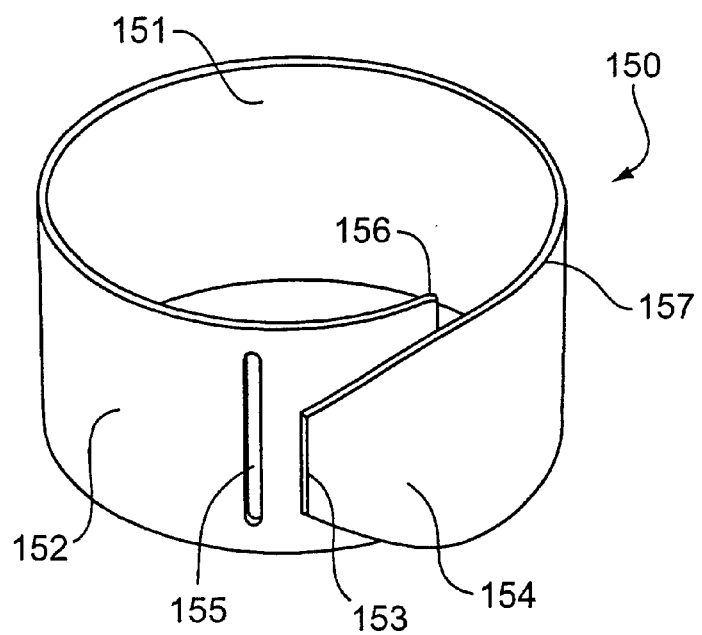
FIG. 9 illustrating a top side view of a foil in a preferred exemplary embodiment.

Sometimes, a photographer desires to change the ambient light to change the lighting of a photograph. To change the ambient light, foil 150 may be placed around cover 110 and/or extension collar 140. A preferred embodiment of foil 150 is illustrated in FIG. 9. Foil 150 is a flat piece 157 of photographic fabric having a first end 154 and second end 156. First end 154 wraps around and affixes to second end 156 to enclose cover 110 and/or extension collar 140. In a preferred embodiment, first end 154 has a taped end 153 that fits into a slot 155 on second end 156 to affix the opposing ends.

The photographic fabric that foil 150 is made of may be either gold or silver photographic material. In a preferred embodiment, foil 150 has a first side 151 of gold photographic material and a second side 152 of made of silver photographic material. Thus, depending on the direction in which foil 150 is wrapped allows a photographer to use a different color of photographic material to change the ambient light.

Sometimes a photographer may desire to change the color of a background of a photograph. Therefore, lighting extension 100 includes pad 160. Pad 160 is made of a colored material that rests upon a surface. The object 101 is then place upon pad 160. Cover 110 rests upon pad 160 which provides a background for said photograph.

Figure 10:
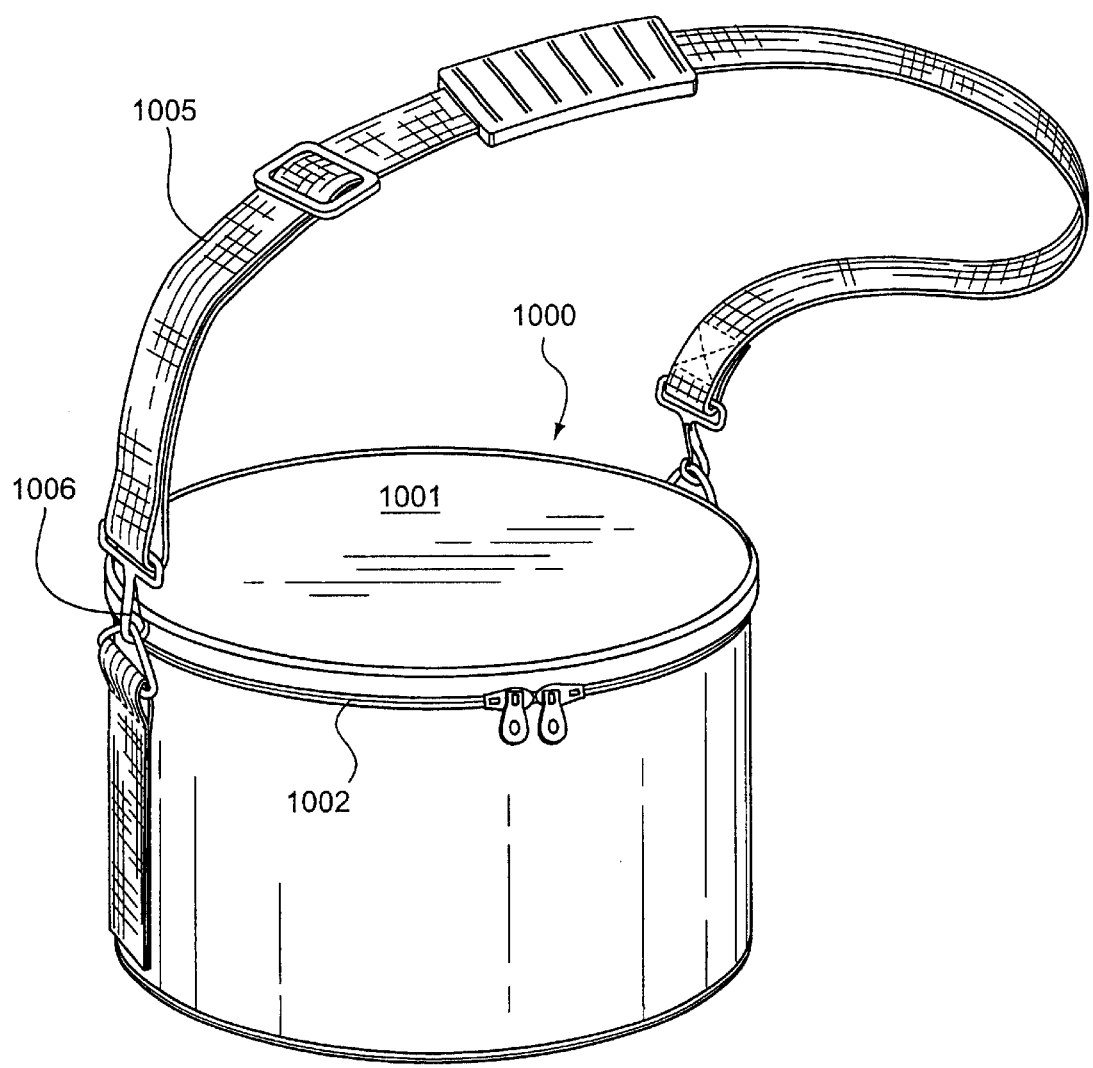
FIG. 10 illustrating a top side view of a carrying case.

FIG. 10 illustrates carrying case 1000 that receives cover 110 and stores cover 110 for use. In a preferred embodiment, carrying case 1000 has a cylindrical shape. Lid 1001 on a top side of carrying case 1000 opens to allow access to enclosed area. In a preferred embodiment, lid 1001 is affixed to the cylindrical sides of carrying case 1000 by a piece of fabric (Not Shown) and zipper 1002. Zipper 1002 affixes cover 1001 in a closed position. One skilled in the art will recognize that any other type of fixture may be used to affix lid 1001 to carrying case 1000. Carrying case 1000 may also have a strap 1005. Strap 1005 may be affixed to carrying case 1000 by hook and strap member 1006. One skilled in the art will recognize that the strap 1005 may also be affixed by other methods such as gluing or sewing the strap to carrying case 1000.

Figure 11:
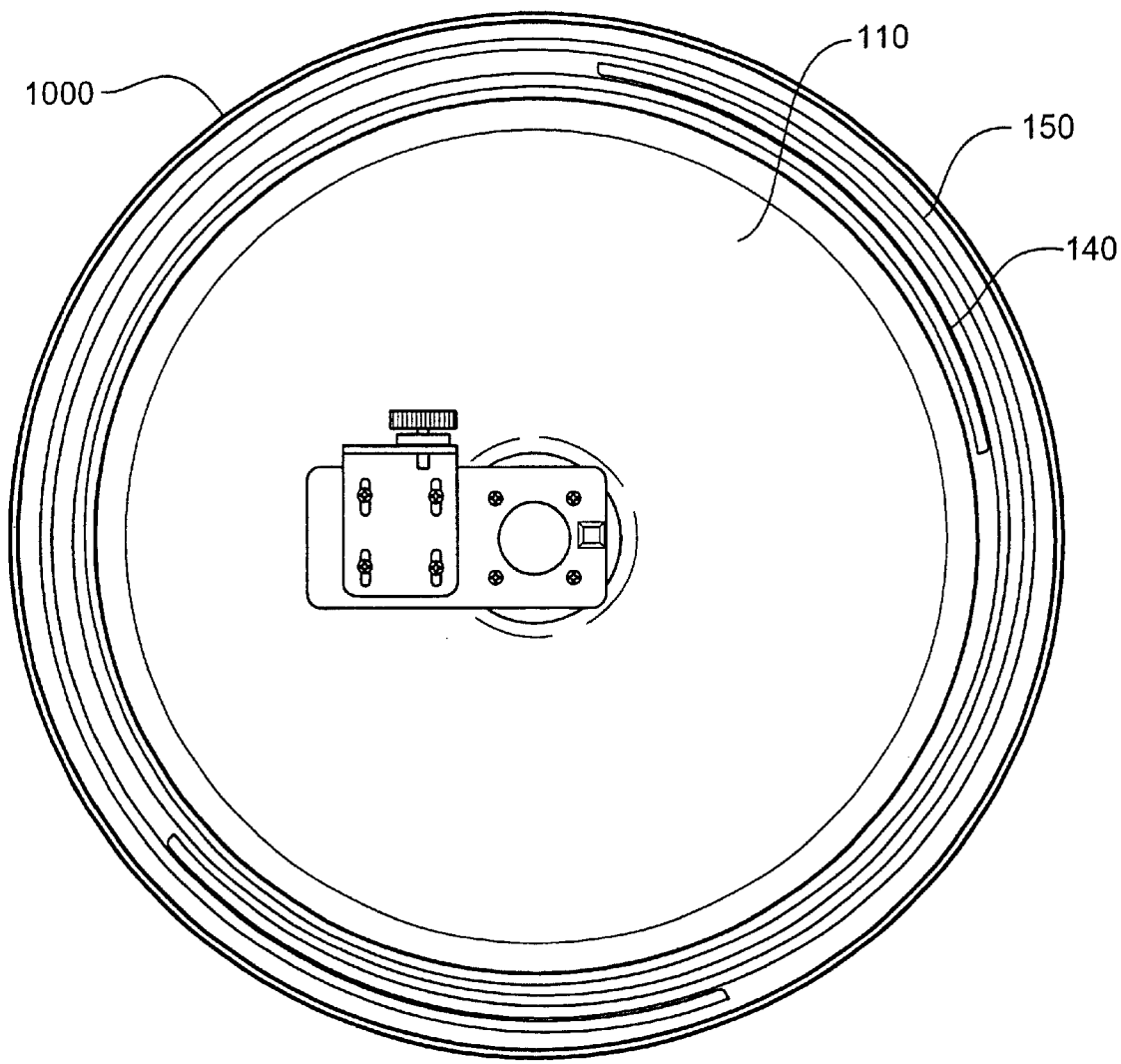
FIG. 11 illustrating an inside of the carrying case.

FIG. 11 illustrates an inside of carrying case 1000 with a lighting extension system of this invention stored inside carrying case 1000. Cover 110 fits inside carrying case 1000 proximate a center of carrying case 1000. In a preferred embodiment, there is a groove (Not Shown) in the bottom of case 1000 that is mated to the bottom of cover 110. The groove receives the bottom of cover 110 and fits cover 110 in place inside carrying case 1000. Extension collar 140 fits inside carrying case 1000 around cover 110. In a preferred embodiment, there is a second groove (Not Shown) that is mated to receive extension collar 140. Foil 150 may be inserted around the outer perimeter of the inside of carrying case 1000. There may also be grooves for foil 150 or foil 150 may be placed in carrying case 1000 loosely.

The above is a description of a preferred embodiment of a lighting extension 100 in accordance with this invention. It is expected that those skilled in the art can and will design alternate lighting extensions that infringe on this invention as set forth below either literally or through the Doctrine of Equivalents.

What is claimed is:

1. An apparatus that diffuses light to photograph an object comprising:
    a translucent lighting extension that surrounds said object, said lighting extension comprising a cover that is made of translucent material that diffuses light from outside of said cover and minimizes shadows cast by said object;
    an opening proximate a top of said cover through which a lens of a camera photographs said object; and
    a camera mounting bracket that affixes to said cover and is proximate to said opening and holds a camera in a position to allow said camera to take a photograph through said opening.

2. The apparatus of claim 1 wherein said cover is hemispherical shaped.

3. The apparatus of claim 1 wherein said cover is conical shaped.

4. The apparatus of claim 1 wherein said cover is bell shaped.

5. The apparatus of claim 1 wherein said cover is cubical shaped.

6. The apparatus of claim 1 wherein said camera mounting bracket comprises:
a base that supports said camera.

7. The apparatus of claim 6 wherein said base comprises:
a platform that includes a coupling that affixes to said cover proximate said opening; and
an opening through said platform that mates with said opening through said cover to allow said lens of said camera to photograph said object through said cover.

8. The apparatus of claim 7 wherein said base further comprises:
a locking mechanism that affixes said camera to said platform.

9. The apparatus of claim 8 wherein said locking mechanism comprises:
a brace that extends upward substantially perpendicular from one side of the base;
an opening through said brace; and
a screw that fits through said opening through said brace and mates with a threaded opening on said camera to affix said camera to said brace.

10. The apparatus of claim 6 wherein said base mates with a particular type of camera.

11. The apparatus of claim 10 further comprising:
indicia on said camera mounting bracket that identifies said particular type of camera with which said base mates.

12. The apparatus of claim 1 further comprising:
a lip around a perimeter of a bottom side of a said cover that facilitates resting said cover on a surface over said object.

13. The apparatus of claim 1 wherein said lighting extension further comprises an extension collar made of translucent material that forms a wall having a shape of a bottom perimeter of said cover and upon which the bottom perimeter of said cover rests to increase an inside height of said cover.

14. The apparatus of claim 13 wherein said extension collar is seamless.

15. The apparatus of claim 13 further comprising a lip around a bottom side of said cover that rests upon an upper side of said wall of said extension collar.

16. The apparatus of claim 13 wherein said cover is rotatable about said extension collar to change camera angles.

17. The apparatus of claim 1 further comprising:
a carrying case that receives said cover and stores said cover for use.

18. The apparatus of claim 17 wherein said carrying case is cylindrical.

19. The apparatus of claim 18 further comprising:
an area in a center of said carrying case formed to receive said cover.

20. The apparatus of claim 18 further comprising:
a groove in a bottom side of an inside of said carrying case mated to a bottom perimeter of said cover for receiving said cover.

21. The apparatus of claim 17 further comprising:
a groove in a bottom of an inside of said carrying case for receiving an extension collar.

22. The apparatus of claim 17 further comprising:
an area proximate a circumference of said carrying case for receiving a piece of photographic material.

23. A method for diffusing light to photograph an object comprising the steps of:
enclosing said object with a translucent lighting extension that surrounds said object and includes a cover that is made of translucent material to diffuse light from outside of said cover and minimizes shadows cast by said object;
protruding a camera lens though an opening proximate a top of said cover to photograph said object; and
securing said camera to a camera mounting bracket that affixes to said cover and is proximate to said opening and holds said camera in a position to allow said camera to take a photograph through said opening.

24. The method of claim 23 wherein said cover is hemispherical shaped.

25. The method of claim 23 wherein said cover is conical shaped.

26. The method of claim 23 wherein said cover is bell shaped.

27. The method of claim 23 wherein said cover is cubical shaped.

28. The method of claim 23 further comprising the steps of:
coupling a platform of said camera mounting bracket to said cover proximate said opening; and
mating an opening through said platform with said opening through said cover to allow said lens of said camera to photograph said object through said cover.

29. The method of claim 28 further comprising the step of:
providing a locking mechanism that affixes said camera to said platform.

30. The method of claim 23 wherein said camera mounting bracket mates with a particular type of camera.

31. The method of claim 30 further comprising the step of:
indicating said particular type of said camera that mates with said camera mounting bracket.

32. The method of claim 23 further comprising the step of:
resting a lip around a perimeter of a bottom side of said cover on a surface over said object.

33. The method of claim 23 further comprising the step of:
placing said cover on an extension collar made of translucent material that forms a wall having the shape of a bottom perimeter of said cover and upon which the bottom perimeter of said cover rests to increase an inside height of said cover.

34. The method of claim 33 wherein said extension collar is seamless.

35. The method of claim 33 wherein said step of placing said cover on said extension collar further comprises the step of:
resting a lip around a bottom side of said cover upon an upper side of said extension collar.

36. The method of claim 33 further comprising the step of:
rotating said cover about said extension collar to change angles of a photograph.

37. The method of claim 33 further comprising the step of:
affixing a plurality of legs to a bottom side said cover.

38. The method of claim 37 wherein at least one of said plurality of legs is shorter than at least one other of said plurality of legs to angle said cover.

39. The method of claim 23 further comprising the step of:
providing a carrying case that receives said cover and stores said cover for use.

40. An apparatus that diffuses light to photograph an object comprising:

a lighting extension that surrounds said object and includes a cover that is made of translucent material that diffuses light from outside of said cover and minimizes shadows cast by said object;

an opening proximate a top of said cover through which a lens of a camera photographs said object; and a plurality of legs that affix to a lip on a bottom side of said cover to increase the height inside said cover.

41. The apparatus of claim 40 wherein at least one of said plurality of said legs is shorter in length than others of said plurality of legs to change an angle at which a picture is taken.

42. An apparatus that diffuses light to photograph an object comprising:

a translucent lighting extension that surrounds said object, said lighting extension comprising a cover that is made of translucent material that diffuses light from outside of said cover and minimizes shadows cast by said object;

an opening proximate a top of said cover through which a lens of a camera photographs said object; and a material that wraps around said cover to change the ambient light for said photograph.

43. The apparatus of claim 42 wherein said material is made of silver photographic material.

44. The apparatus of claim 42 wherein said material is made of gold photographic fabric.

45. The apparatus of claim 42 wherein said material comprises:

a flat piece of photographic fabric having a first end and a second end wherein said first end wraps around and affixes to said second end to enclose said cover.

46. An apparatus that diffuses light to photograph an object comprising:

a translucent lighting extension that surrounds said object, said lighting extension comprising a cover that is made of translucent material that diffuses light from outside of said cover and minimizes shadows cast by said object;

an opening proximate a top of said cover through which a lens of a camera photographs said object; and a pad made of a colored material that rests upon a surface wherein said cover rests upon said pad and wherein said pad provides a background for said photograph.

47. An apparatus that diffuses light to photograph an object comprising:

a translucent lighting extension that surrounds said object, said lighting extension comprising:

a cover that is made of translucent material that diffuses light from outside of said cover and minimizes shadows cast by said object; and an extension collar made of translucent material that forms a wall having a shape of a bottom perimeter of said cover and upon which the bottom perimeter of said cover rests to increase an inside height of said cover, wherein said extension collar comprises a flat piece of said translucent material having a first end and a second end wherein said first end wraps around and affixes to said second end to create said shape of said bottom perimeter; and wherein said cover includes an opening proximate said top of said cover through which a lens of a camera photographs said object.

48. A method for diffusing light to photograph an object comprising the steps of:

enclosing said object with a translucent lighting extension that surrounds said object and includes a cover that is made of translucent material to diffuse light from outside of said cover and minimizes shadows cast by said object;

protruding a camera lens though an opening proximate a top of said cover to photograph said object;

placing said object on a pad made of a colored material that rests upon a surface: and resting said cover upon said pad wherein said pad provides a background for said photograph.

49. A method for diffusing light to photograph an object comprising the steps of:

enclosing said object with a translucent lighting extension that surrounds said object and includes a cover made of translucent material to diffuse light from outside of said cover and minimizes shadows cast by said object;

protruding a camera lens though an opening proximate a top of said cover to photograph said object: and wrapping a material around said cover to change the ambient light for said photograph.

50. The method of claim 49 wherein said material is made of silver photographic material.

51. The method of claim 49 wherein said material is made of gold photographic fabric.

* * * * *